A. A. NELSON.
TIRE TOOL.
APPLICATION FILED JUNE 28, 1911.
1,041,660.
Patented Oct. 15, 1912.
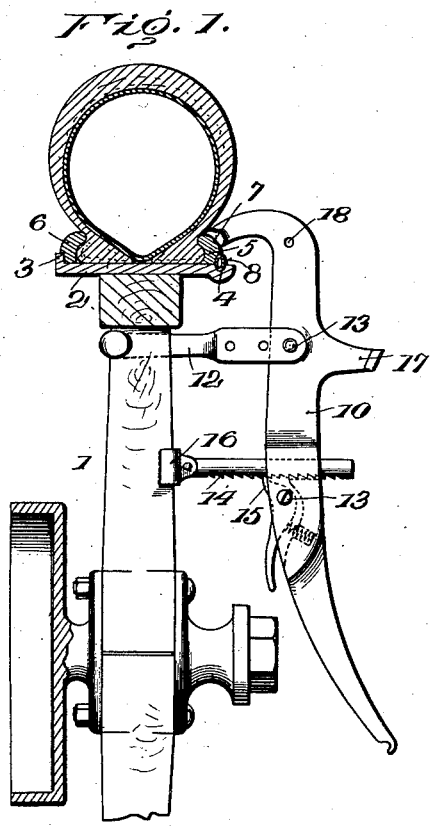
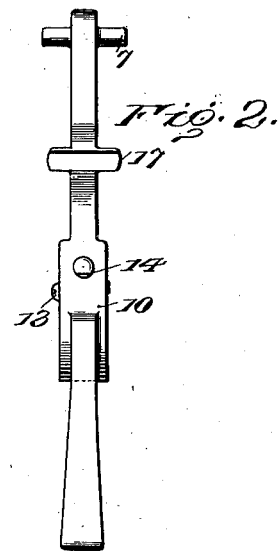
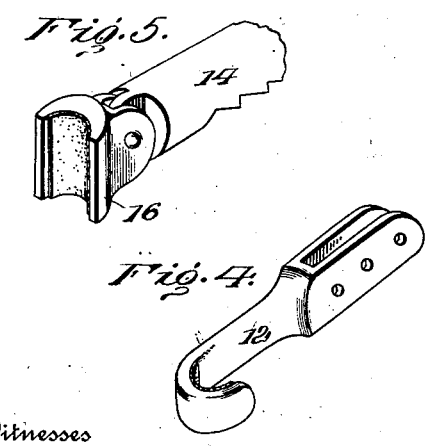
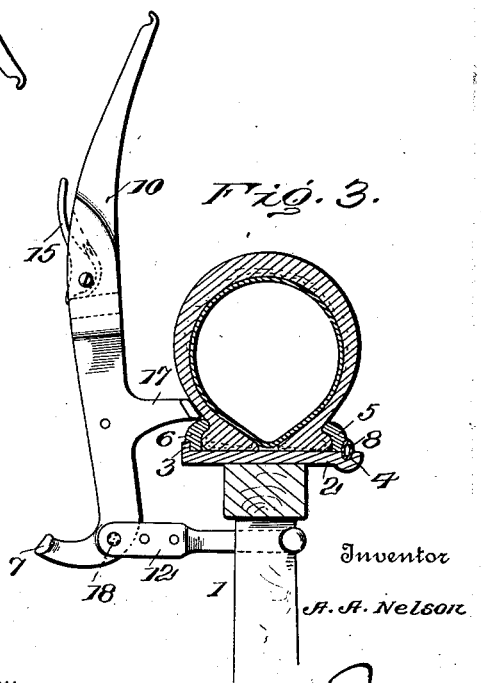
Witnesses
W. A. Williams
Francis S. Maguire
Inventor
A. A. Nelson
By _____ Attorney

UNITED STATES PATENT OFFICE.

AXEL A. NELSON, OF WASHINGTON, DISTRICT OF COLUMBIA.

TIRE-TOOL.

1,041,660.   Specification of Letters Patent.   Patented Oct. 15, 1912.

Application filed June 28, 1911. Serial No. 636,338.

*To all whom it may concern:*

Be it known that I, AXEL A. NELSON, of Washington, in the District of Columbia, have invented certain new and useful Improvements in Tire-Tools; and I do hereby declare the following to be a full, clear, and exact description of the invention, such as will enable others skilled in the art to which it appertains to make and use the same.

The primary object of this invention is to provide a simple and highly efficient tool for setting and removing automobile tires of the "quick detachable" type. The shoe or casing of tires of this type is held in place between two rings, the outer one of which is retained by a locking ring which fits in an annular groove of the wheel rim. In applying the casing it is necessary that the outer ring be forced inwardly a sufficient distance to enable the locking ring to be properly seated, and in many instances it is necessary to similarly force the outer ring to permit the locking ring to be unseated. Holding the outer ring out of the way has heretofore been attended with considerable difficulty; frequently the services of two persons being required, especially in applying the casing, and the difficulty is increased if the casing is new and hence relatively stiff. I have provided a simple device for engaging the outer ring and forcing it inwardly over the wheel rim, such device being automatically locked in whatever position it may be placed and as it holds the ring and the casing out of the way, the operator has his two hands free to apply or remove the locking ring. The same device may be employed for engaging the inner side of a casing to force it from the rim.

The invention will be hereinafter set forth and particularly pointed out in the claim.

In the accompanying drawings, Figure 1 is a side elevation of my device showing it applied to a wheel, a portion only of which is shown, with the tire casing in section. Fig. 2 is a view of the device at right angles to Fig. 1. Fig. 3 shows the device as used for removing a casing. Fig. 4 is a detached view of the spoke engaging hook. Fig. 5 is a view of the spoke engaging end of the rack-bar.

Referring to the drawings 1 designates the wheel of an automobile, a portion only of which is shown; 2 the rim; 3 a vertically disposed flange at the inner edge of the rim; and 4 a seat for the locking ring, which seat is formed by a concaved flange. The shoe of casing 5 is held in place between an inner ring 6, which seats against flange 3, and an outer ring 7 which is locked by a ring 8 which fits in seat 4.

To insert the locking ring it is necessary that the outer ring 7 be forced inwardly over the rim sufficiently far to have a seat 4 unobstructed. For this purpose I provide a lever 10 which has an overhanging arm at one end, which end is curved to conform to ring 7. The lever is placed substantially parallel with the wheel, and to it is pivotally secured a hook 12 which is designed to grip any one of the spokes of the wheel, and to prevent scratching the hook is preferably covered with leather or other soft material. The hook forms the fulcrum for the lever, and the pivot pin 13, upon which the lever turns, may be passed through any one of a series of holes in the hook, thus adapting the device to wheels of different sizes.

A strut shown in the form of a rack-bar 14, carried by the lever, is designed to engage any one of the wheel spokes, and itself is engaged by a spring-pressed pawl 15 of the lever when the latter is pulled outwardly. By this means the lever is braced and automatically locked in whatever position it may be placed by the operator, and as the pressure of the lever is sufficient to hold the outer ring 7 from interfering with the seating of the locking ring, it is manifest that the operator has his hands free to manipulate such locking ring.

I have shown the rack-bar as having a shoe 16 pivoted to its inner end, which shoe is concaved to conform to the spoke, and it preferably is faced with soft material.

To enable the device to be used for forcing a casing from the wheel rim, as is frequently necessary where a casing has been long in use, I provide the lever with a short lateral arm or projection 17, which, when the lever is inverted, as shown in Fig. 3, by engaging with the casing can force the latter from the rim. This requires, however, that the point of connection of the hook 12 be changed, and for this purpose I have formed in the lever near its curved arm an opening 18 to accommodate the fulcrum pin 13 when the position of the hook is changed. The device must necessarily be used in this way in removing casings from rear wheels of automobiles, since the brakes preclude it from being positioned over the inner face of the wheel in the manner similar to that which it occupies in applying the casing, but it may be used in the latter way in removing the casings from the front wheels.

From what has been said it will be observed that I have provided an extremely inexpensive tool for setting and removing tire casings; one which may be carried in the tool box of an automobile; and that in applying the pressure to the casing ring the tool is automatically braced or locked in its ring-holding position, thereby leaving both hands of the operator free for manipulating the locking ring. It is only necessary to disengage the pawl from the rack-bar to enable the device to be removed, the outer ring being moved outwardly either from the rim or into engagement with the locking ring when the pressure of the holding lever is removed.

By means of my invention a great saving in time is effected in applying and removing casings from automobile wheels of the so-called "quick detachable" type.

I claim as my invention:

A tire-casing tool comprising a lever having an off-set arm at one end thereof for engaging the casing ring, a fulcrum bearing for said lever extending from the same between its ends to detachably engage a wheel spoke, and a strut located between said fulcrum and the handle end of the lever which is adapted to bear at one of its ends against the wheel and to adjustably engage the lever so as to hold the lever in different positions into which it may be moved when in engagement with the tire-casing.

In testimony whereof, I have signed this specification in the presence of two subscribing witnesses.

AXEL A. NELSON.

Witnesses:
 JAMES H. SHELLY,
 FRANCIS S. MAGUIRE.